Patented Apr. 11, 1950

2,503,665

UNITED STATES PATENT OFFICE 2,503,665

COLORATION OF FRESH CITRUS FRUITS

Carl E. Gericke, Puerto Castilla, Honduras, assignor to American Machinery Corporation, Orlando, Fla., a corporation of Florida No Drawing. Application February 2, 1950, Serial No. 141,871

11 Claims. (Cl. 99—103)

This invention relates to the commercial preparation of fresh whole fruit for the market, and particularly to the impartation of a desirable coloration. More in particular this refers to citrus fruit which reaches a stage of maturity wherein the fruit itself has come to a ripened condition but the skin or peel thereof has an off-color and in some extreme cases a yellow or greenish yellow color, which lowers their acceptance on the market. This application for Letters Patent is a continuation-in-part of the copending application, Serial No. 692,701, filed August 23, 1946.

As disclosed in Patent No. 1,909,860, issued to Rodney B. Harvey, citrus fruits vary in color, but variations from the standard varietal color do not necessarily mean that the fruit is immature or of low quality. This patent discloses a method of enhancing the color of fruit by subjecting the fruit to the action of a neutral or alkaline oleaginous material containing a coloring agent and suggests further that at least part of this mixture is neutralized by a base. This produces a soap which in conjunction with the proper dye is used to treat off-color fruit. This solution due to its constituents is of necessity alkaline in nature. The Patent No. 2,062,903 to James O. Handy treats citrus fruit with an aquosolufacient which comprises a sodium salt of various compounds or a triethanolamine salt of a fatty acid.

These patents disclose methods for the treatment of citrus fruit which in actual practice require temperatures much in excess of 120° F. for coloring the orange satisfactorily—i. e. usually between 127° F. and 132° F.—with an oil soluble dye suspended in an alkaline aqueous bath containing an oil solvent for dye or containing a saponified oil by which the dye is dispersed in the solution, with or without added oily solvent for the dye, so as to impregnate the skin or peel of the fruit when any dyeing of the fruit is contemplated. In such alkaline baths, unless great care is exercised to maintain the primary concentration of solvent therein, when such solvent is used, and the proper emulsification of it, the fruit is burned and, where soap and dyes alone are employed in such baths, very high temperatures in the order of 130° to 140° F. are required.

The object of the present invention is to enhance the natural coloration of citrus fruit, particularly oranges, by the use of a color bath which does not employ a soap but in which the soap is replaced by a surface active agent of a cationic type that suspends the dye in such a state of subdivision that its entrance into the peel is facilitated and accomplished at considerably lower temperatures than those at present employed, thus retaining the flavor of the fruit; that provides a medium which enhances the activity of a fungicidal agent for the fruit; that may be compounded with greater ease than known color baths; that may be used with water containing iron and other minerals without previously being subjected to softening treatment; and that gives a suspension of the dye in the concentrated form that has better keeping qualities in storage, as respects suspension, for longer periods of time prior to dilution for use than other known citrus fruit coloring concentrates.

These objects are attained broadly by use of an aqueous bath, containing cationic surface active agents and a suspension of a dyeing agent, and bringing the fruit into contact with such bath.

Surface active agents have several general uses, one of which is a dispersion of a solid into a liquid to produce a suspensoid. These surface active agents fall into three general classifications, hydrophilic, anionic and cationic. The cationic and anionic compounds are usually long chain carbon compounds with a terminal grouping capable of ionizing when put into solution in an aqueous medium. When finely divided material, which is to be dispersed, is placed or produced in such an aqueous medium containing an ionized surface active agent, the molecules of the ionized surface active agent orient themselves so that the carbon chain of the molecules either dissolve in or are attracted by the finely divided material to be dispersed, while the terminal groupings bearing the charge of the molecules extend into the aqueous medium. In this manner an aggregation of finely divided and stabilized particles are formed in the aqueous medium, each of which are stabilized by one or more electric charges. The surface active agents used in carrying out the present invention are of the cationic type which offer many advantages over the other two types of surface active agents.

The hydrophilic surface agents with respect to their molecular structure are typified by a long carbon chain molecule which bear no electric charge in solution while the anionic surface agents are also typified by a long carbon chain molecule which bears a negative charge when acting as an emulsifier or dispersing agent, such as a fatty acid. On the other hand, the cationic agents are typified by a long carbon chain molecule with a terminal nitrogen containing group which bears a positive charge when acting as a stabilizer for an emulsion or suspensoid. Such cationic surface active agents are represented by the organic amines in their many forms.

In carrying out the present invention an organic amine or an organic amine salt solution is mixed, with or without heating (heating being used to accelerate solution), with an oil-soluble dye to form a concentrate. This concentrate is further diluted with water to make a bath for the treatment of citrus fruit, more in particular, oranges. The amines which are contemplated for use in this invention must have one or more of the hydrogen atoms attached to the ammonium nitrogen replaced by hydrocarbon radicals. The organic amine salts that fall within the scope of this invention are the amine salts formed from the amines as defined herein and an acid of a monobasic organic or inorganic type. It has been found that not all of the compounds falling within this class will work satisfactorily, but only those compounds wherein at least one of the hydrocarbon groups contains 10 to 20 carbon atoms. It should further be related that the secondary and tertiary amines should contain only one carbon chain of the type just specified and that the second side grouping in the secondary amine and the second and third side groups in the tertiary amine should contain as few carbon atoms as possible. The description herein given should not be construed to mean that ring configurations must be absent since it has been found that some compounds consisting of a long carbon chain molecule, to which is molecularly and terminally attached a nitrogen containing ring, are also effective as surface active agents. Such a compound is represented by 1-hydroxy ethyl-2-hepta decenyl glyoxalidene amine, known on the market as Cationic Amine 220, which consists of a long aliphatic chain connected to a glyoxalidine ring and is manufactured by Carbon and Carbide Chemical Corporation, New York city, New York.

Another example of the production of an amine, having the properties set forth above, is a condensation product obtained by reacting ethylene oxide with a substituted amine having a side chain of between 10 to 20 carbon atoms and 2 replaceable hydrogen atoms attached to the nitrogen atoms. This type of reaction is illustrated by the condensation product of N primary hexa decyl amine with ethylene oxide.

The acids used to form the amine salts are monobasic acids such as hydrochloric, hydrobromic, acetic, formic, lactic, etc.

It is well known that many commercial amines on the market are handled under trade names and are sometimes a mixture of amines rather than a pure compound. These mixtures are satisfactory. The Sharples Chemical Company and Armour & Company are two corporations marketing such amines.

The following compounds have been tried and have given satisfactory results:

*Trade name or designation by Armour & Company as of 1945*

| amines, present primary | Chain Length | AM-1120 | AM-1140 | AM-1160 | AM-118.5-B | AM-1180 | AM-Coco-B |
|---|---|---|---|---|---|---|---|
| | | Per cent | Per cent | Per cent | Per cent | Per cent | Per cent |
| Octyl | $C_8$ | | | | | | 8 |
| Decyl | $C_{10}$ | | | | | | 9 |
| Dodecyl | $C_{12}$ | 90 | 4 | | | | 47 |
| Tetradecyl | $C_{14}$ | 9 | 90 | | | | 18 |
| Hexadecyl | $C_{16}$ | | 4 | 90 | 30 | 6 | 8 |
| Octadecyl | $C_{18}$ | | | 6 | 25 | 93 | 5 |
| Octadecenyl | $C_{18}$ | 1 | 2 | 4 | 45 | 1 | 5 |
| Ave. Mol. Wt. | | 185 | 213 | 244 | 263 | 267 | 200 |
| Primary amine by titration | | 97 | 97 | 97 | 97 | 97 | 97 |
| Approx. melting point, °C | | 24 | 29 | 38 | 41 | 55 | 21 |

All were of the "purified" grade (distilled).

One of the preferred materials is the amine prepared from abietic acid and the substance has the formula $$C_{20}H_{31}-NH_2$$

Any one of the above amines or any mixture thereof may be employed. In addition to these compounds above noted, the compounds known as AM-2120 and AMCL-4 COCO-C may be employed, the first compound consisting primarily of didodecyl ammonium chloride (secondary amine) and the second compound consisting of a mixture of quaternary ammonium salts containing an aliphatic side chain having 12 to 14 carbon atoms. The best results were obtained with AMCL-4 COCO-C, AM-Coco-B, AM-2120 and the amine prepared from abietic acid; and also with Arquad-S, Arquad-T, Ethomeen S-20, Ethomeen S-25 and compound RD1023 obtainable from Armour & Company. Arquad-S is a quaternary ammonium compound having a side chain principally containing 18 carbon atoms; Arquad-T is similar in structure having a side chain of 16 to 18 carbon atoms; RD1023 is a condensation of amines containing 16 to 18 carbon atom side chains with ethylene oxide and the resulting amine formed into a quaternary salt; and the Ethomeens are amines containing a carbon chain C-16 to C-18 in length which have been modified, by the addition of ethoxy and hydroxy substituents to the molecules, to increase the water solubility of the amine.

As one example or formula for preparing an amine salt dispersion according to the present invention, mix 1 pound of a dispersible edible oil-soluble dye (preferably Food, Drug and Cosmetic—Red No. 32) and 18 pounds of AM-Coco-B and heat, preferably with stirring, to obtain a suspension of the dye, the necessary amount of hydrochloric or acetic acid being added to neutralize the amine.

As an example of a formula using quaternary salt dispersion according to this invention, mix 1 pound of dispersible edible oil soluble dye (preferably F. D. C. Red No. 32) and 18 pounds of RD1023 and then heat, preferably with stirring, to obtain a suspension of the dye.

As an example of a formula for using an amine base according to this invention, mix 1 pound of dispersible edible oil soluble dye (preferably F. D. C. Red No. 32) and 18 pounds of Ethomeen S-25 and then heat, preferably with stirring to obtain a suspension of the dye.

The above mixtures are 100% concentrates and may be shipped to customers or user and/or stored by him until used. This is advantageous— in that these 100% concentrates have less bulk and weight and remain in a liquid state—over concentrates using anionic dispersing agents and which have to be diluted with water to prevent the concentrate from becoming a solid mass and difficult to handle by the customer; however, the concentrates of the above formulae, in certain circumstances, may be sold in slightly diluted form by the addition of small quantities of water (say 20 gallons to the above formula) so as to facilitate mixing in the bath by inexperienced personnel, but this is not ordinarily necessary.

A concentrate, prepared as above, is formed into a bath by the addition of water diluting the concentrate to the extent that the final concentrate of dye will be approximately .025% in the total bath. This is about 1 part of dye to 4000 parts of water. The oranges are contacted with said bath (by submerging and flooding or spraying) at temperatures preferably ranging in the order of 104° F. to 120° F. for the necessary period of time (usually from 2 to 4 minutes) which gives a permanent satisfactory color depending upon the condition of the fruit and upon the depth of coloration desired. Excellent results have been obtained with a bath temperature between 110° F. and 118° F., to properly color an orange with a uniform color and free from blotches and of the maximum legal intensity. The higher limit of the approximate range given above may be extended to the legal limit of 124° F. but it is to be noted that satisfactory coloration is obtainable at temperatures well below the legal maximum of 124° F. The temperature of the bath may be slightly reduced below the 104° F. level but the coloration is not of satisfactory intensity unless the oranges remain in the bath for an undue length of time.

The other amine compounds, mentioned above, may be mixed and prepared with the dye and water in substantially the same manner and proportions as stated in the examples or formulae just given. However, it is clear to one skilled in the art that certain of the above enumerated amino compounds may be used in the form of the free base and certain others of them, being insoluble in water, must be used in the form of the salt. By the addition to these formulae of an amount of higher alcohols—having limited water solubility, such as terpineol, terpinol, methyl isobutyl carbinol, octyl alcohol, hexyl alcohol, amyl alcohol and butyl alcohol as a few examples— more dye may be added, when coloring certain types of citrus fruit having a rind more resistant to the penetration of the dye, as in the case of Valencia oranges as an example. The addition of such alcohols assists in the suspension of the dye when the concentrate is diluted with water. The use of these alcohols is not necessary to the carrying-out of the broad invention, but they may be used without harmful effects for the purpose just stated. Also, these alcohols act as anti-foaming agents.

The following examples of suitable formulae to incorporate the higher alcohols have been found to be:

Example I 10 parts (by weight) alpha terpineol
10 parts (by weight) methyl iso-butyl carbinol
4 parts (by weight) F. D. & C., Red, No. 32
40 parts (by weight) Ethomeen S-25

Example II 10 parts dispersing agent
1 part dye
3 to 10 parts pine oil (terpene alcohols)

These concentrates are diluted about 1 to 400 with water to make a dye bath which can be used for coloring oranges. In the Example I above given, an optimum dispersion of the alcohol is produced so that an optically clear, cherry-red dispersion is obtained. When the lower molecular weight alcohols, such as butyl alcohol and amyl alcohol, are employed, a much less dispersing agent is required than when the higher molecular weight alcohols are used. The proportion of alcohol to be used is dependent on the amount of coloration desired to be imparted to the fruit and the specific alcohol used—that is to say from 1 part or less to 90 parts of the alcohol. Therefore, it is obvious that proportions of these alcohols may be varied within wide limits, from the optimum above given, provided that a stable condition of the bath is maintained. It has been found that as much as 90 parts of butyl alcohol or 30 parts of methyl butyl carbinol may be employed instead of the pine oil in the second example given above. The emulsion becomes unstable, when its appearance is characterized by a cloudy, opaque, light orange color and when the alcohol has a tendency to separate out. This condition should be avoided because, if the emulsion becomes unstable through the incomplete emulsification of the alcohol, there is danger of "burning" the fruit or unevenly coloring the fruit.

Heretofore, in the enhancement of coloration of oranges, where baths are used, in which the fruit is contacted by the bath, it has been necessary to limit the alkalinity of this bath to a very narrow range, for instance in the order of pH's 7.5 to 11 with most baths maintained at or approximately a pH of 8. It has been found, that with the cationic agents disclosed herein baths can be prepared having a pH varying from 4 to 11. The extremes of this range have been tested and give very satisfactory results. Therefore, because of these satisfactory results, it is felt that this range may be extended, if necessary, beyond these limits and still give good deepening of the color in the skin of the fruit, while heretofore only a bath of limited pH could be used. Consequently, by reason of this invention the bath can be used at any pH which will allow the use of the naturally occurring water of an area where the invention is being practiced, without correction or modification of this water, which correction has heretofore been necessary.

Many advantages in the process herein disclosed are apparent to one skilled in the art. A better suspension is obtained of the dye in an amine solution by the use of a water soluble amine wherein the dye is in a very fine state of sub-division known as a "suspensoid" thus requiring the use of smaller amounts of dye and more completely utilizing the dye than do known soap alkaline and other bath solutions. It does not have the disadvantages of an added excess of fatty acids or other oily or greasy material used to carry the dye from a suspension to the fruit rind. It operates at a low temperature well within the legal limit to give a colored fruit that is satisfactory in every respect.

Another advantage of this process over existing processes is the greater ease for compounding this formula as compared to those containing soap wherein the dye is dissolved in the fatty acid and the soap formed by adding an alkali. This partial neutralization requires more careful control than can be obtained in the average fruit treating plant. Therefore, it is the custom in the trade to ship the concentrate from a central laboratory to the plant. The present process does not require the use of controls of this type and it is therefore possible to prepare the concentrate directly at the plant where it will be used to dye the fruit.

Another advantage resides in the absence of an oily solvent in the bath and the low temperature at which the dyeing process may take place. Previously, the use of higher temperature and/or an oily solvent have resulted in the loss of flavor of the fruit, burning the fruit and causing removal of a large part of the natural wax coating of citrus fruit. The present process, by the employment of a lower temperature and an amine bath and the elimination from the bath of oily or oil-like material, gives a coloring bath that does not burn the fruit and produces a superior colored product which retains more of its natural flavor. If desired, the fruit may be artificially waxed by known methods to give a high lustre and provide shrinkage control of the fruit.

Still another advantage of this process over existing processes is the fact that water containing iron or other dissolved mineral matter, such as hard water found in those communities where limestone or coral formations are common, may be used directly without a preliminary treatment. The alkaline earth and metallic elements remain in solution rather than precipitate out as soaps. Particularly in soap baths, these precipitates eventually foul the dye bath and render it inoperative.

Having thus fully set forth my invention in a manner as will enable others skilled in the art to use and compound the same and, as an aid thereto, having set forth the composition of the compounds that are now purchasable under trade names, I claim:

1. In a process of enhancing the varietal color of citrus fruit, the step of bringing the fruit into contact with a dye suspended in a solution of an amine at a temperature in the order of 104° F. to 124° F., said amine having at least one hydrocarbon chain of 10 to 20 carbon atoms.

2. In a process of enhancing the varietal color of citrus fruit, the step of bringing the fruit into contact with an edible oil soluble dye suspension in an aqueous bath of an aliphatic substituted amine cationic surface active agent having at least 1 hydrocarbon chain of 10 to 20 carbon atoms, said bath being at a temperature approximately 104° F. to 124° F.

3. In a process for enhancing the varietal color of citrus fruit, the step of bringing the fruit into contact with a dye suspended in a solution of a 1-hydroxy ethyl-2-hepta decenyl glyoxalidene amine, said solution being at a temperature approximately 104° F. to 124° F.

4. In a process of enhancing the varietal color of citrus fruit, the step of bringing the fruit into contact with a dye suspended in a solution of a cationic amine at a temperature approximately 104° F. to 124° F., said amine having at least one hydrocarbon chain of 10 to 20 carbon atoms and which amine is modified by the addition of ethoxy and hydroxy groups.

5. In a process of enhancing the varietal color of citrus fruit, the step of bringing the fruit into contact with a dye suspended in a solution of a cationic amine at a temperature approximately 104° F. to 124° F., said amine having at least one hydrocarbon chain of 10 to 20 carbon atoms and which amine is modified by the addition of ethoxy groups.

6. In a process of enhancing the varietal color of citrus fruit, the step of bringing the fruit into contact with a dye suspended in a solution of a cationic amine at a temperature approximately 104° F. to 124° F., said amine having at least one hydrocarbon chain of 10 to 20 carbon atoms and which amine is modified by the addition of hydroxy groups.

7. In a process of enhancing the varietal color of citrus fruit, the step of bringing the fruit into contact with a dye suspended in a solution of a cationic amine at a temperature approximately 104° F. to 124° F., said amine having at least one hydrocarbon chain attached to a glyoxalidine ring.

8. In a process of enhancing the varietal color of citrus fruit, the step of bringing the fruit into contact with an edible oil soluble dye suspension in an aqueous bath of an aliphatic substituted cationic amine surface active agent having at least 1 hydrocarbon chain of 10 to 20 carbon atoms and containing at least one higher alcohol having a limited water solubility, said bath being at a temperature approximately 104° F. to 124° F.

9. In a process of enhancing the varietal color of citrus fruit, the step of bringing the fruit into contact with 1 part of an edible oil soluble dye suspension in an aqueous bath of 10 parts of an aliphatic substituted cationic amine surface active agent having at least 1 hydrocarbon chain of 10 to 20 carbon atoms and containing 3 to 10 parts of terpene alcohol, the bath being at approximately 104° F. to 124° F.

10. In a process of enhancing the varietal color of citrus fruit, the step of bringing the fruit into contact with 1 part of an edible oil soluble dye suspension in an aqueous bath of 10 parts of an aliphatic substituted cationic amine surface active agent having at least 1 hydrocarbon chain of 10 to 20 carbon atoms and containing up to about 90 parts of a higher alcohol having a limited water solubility, the bath being at approximately 104° F. to 124° F.

11. A bath for enhancing the varietal color of citrus fruit, containing an edible oil soluble dye and a substituted cationic amine having at least one hydrocarbon chain of 10 to 20 carbon atoms.

CARL E. GERICKE.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,049,563 | Harvey et al. | Aug. 5, 1936 |
| 2,092,091 | Sharma | Sept. 7, 1937 |

FOREIGN PATENTS

| Number | Country | Date |
|---|---|---|
| 407,973 | Great Britain | of 1934 |